United States Patent [19]

Plegat

[11] 4,180,032
[45] Dec. 25, 1979

[54] DEVICE FOR THE REGULATION OF THE TEMPERATURE OF A SUPERCHARGED DIESEL ENGINE

[75] Inventor: Alain E. Plegat, Asnieres, France

[73] Assignee: Societe Anonyme des Usines Chausson, Asnieres, France

[21] Appl. No.: 766,794

[22] Filed: Feb. 8, 1977

[30] Foreign Application Priority Data

Feb. 10, 1976 [FR] France .............................. 76 03646

[51] Int. Cl.² .............................................. F02B 33/44
[52] U.S. Cl. ........................... 123/119 CD; 123/119 C
[58] Field of Search .................... 123/119 C, 119 CD; 60/599, 605; 261/DIG. 51

[56] References Cited

U.S. PATENT DOCUMENTS

| | | | |
|---|---|---|---|
| 2,633,698 | 4/1953 | Nettel | 60/599 |
| 3,134,371 | 5/1964 | Crooks | 123/119 CD |
| 3,439,657 | 4/1969 | Gratzmuller | 123/119 CD |
| 3,752,132 | 4/1971 | Bentz | 123/119 CD |
| 4,000,725 | 1/1977 | Harris | 123/119 CD |

*Primary Examiner*—Ronald H. Lazarus
*Attorney, Agent, or Firm*—Browdy and Neimark

[57] ABSTRACT

To ensure regulation of the temperature of the supercharging air of a diesel engine, the overfeeding air passes into a first heat exchanger which is cooled by the cooling water of the engine having passed into a second heat exchanger in which the flow is sufficiently low to substantially cool the water. The remaining portion of the water to be cooled passes through a third heat exchanger placed downstream the second heat exchanger. The water having cooled the supercharging air passes also into an oil heat exchanger.

10 Claims, 2 Drawing Figures

DEVICE FOR THE REGULATION OF THE TEMPERATURE OF A SUPERCHARGED DIESEL ENGINE

FIELD OF THE INVENTION

The present invention relates to a new device for the regulation of the temperature of a supercharged diesel engine and attachments of the engine. This invention relates more particularly to engines for industrial purposes, but it can also be used in moving engines or other like applications.

BACKGROUND OF THE INVENTION

It is important in supercharged diesel engines that the supercharging air be brought to the intake of the engine at a relatively low temperature, if possible, lower than 70° C. or slightly higher than this temperature, whatever the ambient temperature may be. Actually, the yield of the thermodynamic cycle of the diesel engine is greatly affected if the supercharging air is raised to too high temperature. On the other hand, the oil of the diesel engine must also be cooled when it is in normal working conditions and this oil must, in contradistinction to the air, be re-heated as fast as possible upon starting of the engine in order that said engine be put under load in the shortest possible time.

It is well known in the art to use the cooling water of the engine to also cool the supercharging air and the oil of the engine. In that case, a heat exchanger of the cooling radiator type is used into which passes the water to be cooled and, at the output, the cooled water is then brought to pass into a supercharging air heat exchanger and into a heat exchanger for the oil. Yet, in this known arrangement, the water coming from the cooling radiator is still at a high temperature, most of the time at least equal to 75° C.; consequently the supercharging air is not cooled enough.

To remedy there has been this disadvantage, there has been two completely separate circuits can be provided, one of them being used to cool the engine water and the other one to cool the supercharging air and to cool the oil. This second type of device is generally satisfactory with regard the temperature to which the supercharging air can be cooled but it is complicated and requires a great number of ducts. Besides, the oil is not quickly heated upon the starting of the engine.

SUMMARY OF THE INVENTION

The invention creates a new device which has the advantage of the simpleness of the first above mentioned circuits and has the efficiency of the double-circuit devices, without having any disadvantage thereof, and this while permitting a quick heating of the engine oil upon the starting of the engine.

According to this invention, the device comprises two heat exchanger circuits for cooling water coming from the engine, the two circuits being fed in parallel with water to be cooled, one of the circuits being directly connected as input to a circulation pump bringing back the water to the engine and the other circuit being connected as input to the same pump through a heat exchanger for cooling the supercharging air of the diesel engine and through a heat exchanger for the engine oil, the two heat exchangers being connected in series.

Various other features of the invention are shown in the following detailed description.

BRIEF DESCRIPTION OF THE DRAWINGS

Embodiments of the object of the invention are shown by way of non-restrictive examples in the accompanying drawings, wherein.

DETAILED DESCRIPTION OF THE PREFERRED EMBODIMENT

Figure 1:
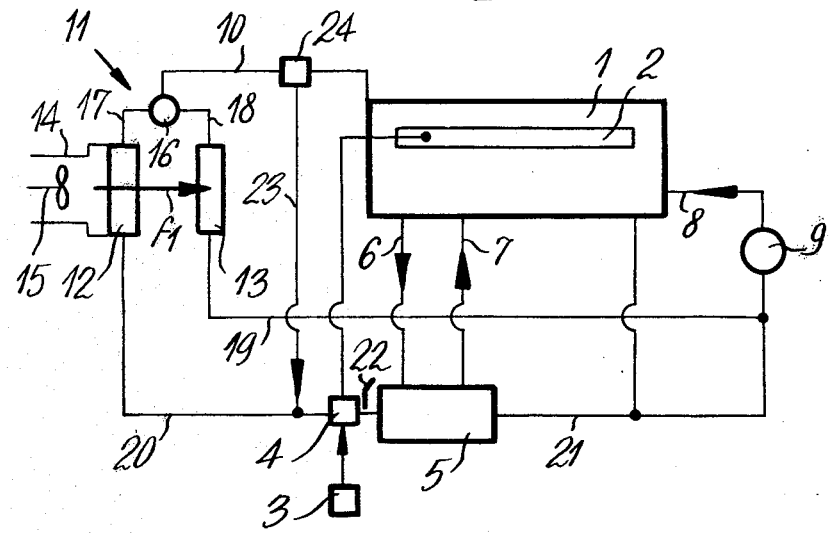
FIG. 1 is a diagram of the cooling circuit of the invention.

In the drawings, reference numeral 1 designates a diesel engine of the supercharged type, which means that the admission manifold 2 of this engine is fed in compressed air by means of a compressor 3 which is driven by the engine 1 or by exhaust gas of the engine by means of a turbine. The supercharging air which is compressed by the compressor 3 comes therefrom at a pressure which can be about three absolute bars and at a temperature about 180° C., which is a notably too high temperature for the feeding of the engine. Consequently, this air has to be cooled, which is ensured in a heat exchanger 4 hereinbelow called supercharging air cooler.

The lubrication of the operating parts of the engine is of course provided by oil, and the oil is raised to a high temperature by the constant operation of the engine and consequently must be cooled. Cooling of this oil is ensured by a heat exchanger 5 or oil cooling device, which is connected to the output of the lubrication circuit through a duct 6 and to the input of the same circuit through a duct 7.

At beginning of the operation of the engine, the lubrication oil is cold and viscous and it is important that this oil be quickly raised to a temperature sufficiently high to reduce its viscosity and to enable the engine to be put under a load or charge.

On the other hand, the engine must be normally cooled and in a well-known way its cylinders comprise cooling jackets or sleeves (not shown) and also channels designed in the cylinder head for circulation of a cooling fluid, generally composed of water with the addition of anti-freeze and other similar products. This water is introduced into the sleeves and channels through a duct 8 placed on the output of a pump 9 driven by the engine.

The cooling water is heated by the engine and driven by a pipe 10 to a double heat exchanger or radiator generally shown at 11. This radiator 11 is composed of two portions 12 and 13 placed one in front on the other, or by two separate radiators, and there is provided a nozzle 14 to canalize the cooling atmospheric air. The nozzle 14 comprises a blower or a turbine 15 to send the air through the double heat exchanger 11 as indicated by arrow $f_1$, which means that it is always the first portion or first radiator 12 through which cold air is passed, the second portion or second radiator 13 being taken passed through by air which has already been partly heated.

The pipe 10 bringing hot water from the engine is connected to the two radiators 12, 13 by a flow regulating valve 16 having two outputs respectively connected by pipes 17 and 18 to the input of the radiators 12, 13. The flow into the two radiators 12, 13 can thus be adjusted to be different.

The portion or radiator 13 is directly connected by a duct 19 to the intake of the pump 9, while output of the portion or radiator 12 is connected through a duct 20 to the input of the cooling circuit of the supercharging air cooler 4 whose output is connected to the cooling input of the oil cooling heat exchanger 5; the output of the latter being itself connected to the input of the circulation pump 9 through a duct 21. Thus, in the embodiment shown in FIG. 1, the radiator 12 is connected in series, on the one hand, to the supercharging air cooler 4 and, on the other hand, to the oil cooling heat exchanger 5.

It is advantageous to provide the circuit of the supercharging air circulation circuit of the cooler 4 with a probe 22 which measures the temperature of the supercharging air at the output of said cooler 4 and which controls the flow regulating valve 16 so that the amount of water passing through the radiator 12 be adjusted according to the temperature of the cooled supercharging air in order that the temperature of this supercharging air will not exceed a predetermined threshold, for example 65° C.

A by-pass pipe 23 controlled by a thermostatic valve 24 is connected between the pipe 10 and the duct 20 in order that the cooling water will pass through this pipe as long as the temperature in the engine does not reach a predetermined threshold.

The above disclosure shows that upon starting the engine 1 the temperature being lower than 65° C., the cooling water is prevented from passing through the radiators 12, 13 and, consequently, the temperature thereof tends to quickly rise. This water which is initially cold, passes through the by-pass pipe 23 and cools the supercharging air compressed by the compressor 3 while passing through the supercharging air cooler 4.

At the output of the supercharging air cooler 4, water which is progressively heated passes through the oil heat exchanger 5 and tends, consequently, to heat the oil which is cold. This water is then brought back into the engine sleeves through the pump 9. When water coming from the engine 1 comes close to the release threshold of the thermostatic valve 24, it only partially cools the supercharging air passing through the cooler 4. This is not very important because during the heating of the engine 1, the engine is, most of the time, under a small load and it is not important that its heat yield be high. Besides, this heating step is relatively of a short duration.

As soon as the engine has reached its normal operating temperature and the cooling water is raised to a temperature corresponding to the operational threshold of the thermostatic valve 24, this valve closes the by-pass circuit 23 and the cooling water is driven to the flow regulating valve 16 which distributes the water into the two portions or radiators 12, 13.

The radiator 12, because it is placed in front of the radiator 13, is better cooled by the cold air blown by the blower 15, and consequently the temperature of the cooled water can be substantially reduced, for example down to 60° C., to enter at this temperature, into the cooling circuit of the supercharging air cooler 4. If needed, it suffices to reduce the flow to lower the temperature at the output of the radiator 12. It is thus possible to reduce the temperature of the supercharging air down to the desired threshold, for example 65° C.

The water having passed through the supercharging air cooler 4 is of course heated, but to a small degree, and most of the time when the water is at a temperature of 60° C. at the input of the supercharging air cooler 4, its temperature at the output does not exceed 65° C. The temperature of the oil circulating into the heat exchanger 5 can thus be reduced in a satisfactory way.

To obtain the above mentioned results, it is in general advantageous that most of the water flow coming from the pipe 10 passes through the second portion 13 into which this water is slightly cooled, for example down to 82° C. when its temperature at the output of the engine is about 85° C. The two water fractions are then mixed into the pump 9, and the resulting temperature of the water which is reintroduced into the engine sleeves can be about 80° C., which corresponds to best operational temperature.

Figure 2:
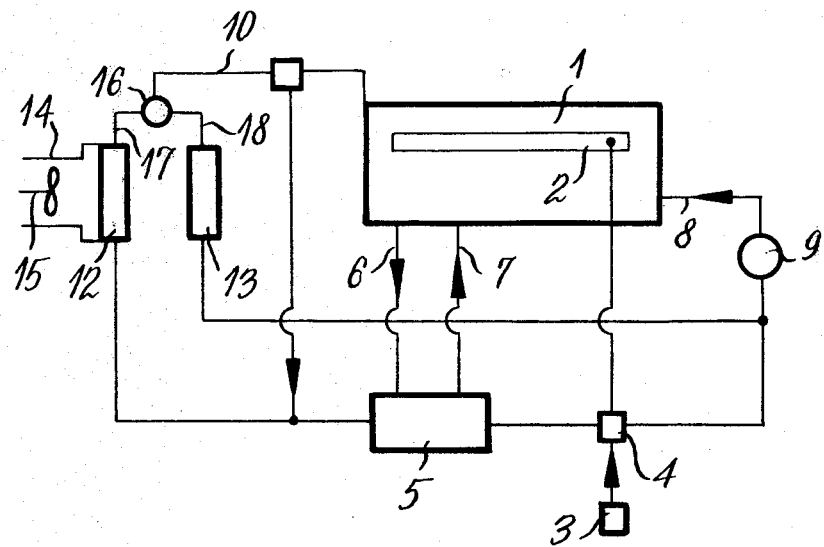
FIG. 2 is a diagram similar to that of FIG. 1 showing a small variant of FIG. 1.

According to the variant of FIG. 2, the circuit comprises the same components as those described with reference to FIG. 1 and they have therefore been designated by the same reference numbers. The only difference is that the supercharging air cooler 4 is placed downstream the oil cooling device 5. In this embodiment, water having passed through the portion 12 arrives of course at a higher temperature at the input of the supercharging air cooler, and consequently the supercharging air is less cooled. Nevertheless it is possible to reduce its temperature down to about 70°-75° C.

The invention is not restricted to the embodiments shown and described in detail, for various modifications can be applied thereto without departing from its scope. Particularly, the flow regulating valve 16 may be controlled not by a thermostatic probe 22, but rather its adjustment can be performed by hand, typically when the engine 1 is a stationary engine whose working load is constant or substantially constant in normal operating conditions as it is the case when such an engine is used in a generator set.

I claim:
1. A system for regulating the temperature of a supercharged diesel engine having parts lubricated by oil, a water cooling jacket having an input and an output, and a supercharging air supply, the system comprising:
   a first water heat exchanging circuit having one input connected to the output of the water cooling jacket of the engine;
   a second water heat exchanging circuit having one input connected to the output of the water cooling jacket of the engine;
   a heat exchanging assembly comprising an air heat exchanging circuit means for cooling the supercharging air supply of the engine and an oil cooling heat exchanger means for cooling the oil lubricating the parts of the engine, said air heat exchanger means being connected to said oil cooling heat exchanger, and said heat exchanging assembly having one input connect to the output of said first heat exchanging circuit;
   a circulation pump having one output connected to the input of the water cooling jacket of the engine, the input of said circulation pump being connected both to the output of the second heat exchanging circuit and to the output of said heat exchanging assembly;
   a by-pass circuit means connected to the output of said water cooling jacket of the engine and to the input of said heat exchanging assembly for causing the water flowing from the water cooling jacket to bypass said first and second water heat exchanging circuits; and
   a valve, said valve being sensitive to the temperature of the water coming from the water cooling jacket of the engine and provided to control the actuation of said by-pass circuit.

2. A system as set forth in claim 1, further including:
first and second radiators connected respectively in said first and second water heat exchanging circuits; and
cooling air flow means for sucking in air from outside the engine and directing said air at said first and second radiators for cooling the water therein.

3. A system as set forth in claim 1, wherein said first heat exchanging circuit is placed between said second heat exchanging circuit and said air flow means.

4. A system as set forth in claim 1, further comprising a flow regulating valve connected between the output of the cooling jacket of the engine and the input of said first and second water heat exchanging circuits.

5. A system as set forth in claim 4, further comprising a means for controlling the actuation of said flow regulating valve, according to the temperature of said air heat exchanging circuit means.

6. A system as set forth in claim 1, further comprising a flow adjusting means for said first heat exchanging circuit for adjusting the flow thereof in such a manner that the temperature at the output of said first water heat exchanging circuit be kept below a predetermined threshold temperature.

7. A system as set forth in claim 1, wherein said first and second heat exchanging circuits are portions of a single heat exchanger circuit.

8. A system as set forth in claim 1, wherein said first and second heat exchanging circuits are portions of two separate heat exchangers.

9. A system as set forth in claim 1, wherein said air heat exchanging circuit means is placed between said oil cooling heat exchanger means and the output of said first water heat exchanging circuit.

10. A system as set forth in claim 1, wherein said oil cooling heat exchanger means is placed between said air heat exchanging circuit means and the output of said first water heat exchanging circuit.

* * * * *